(12) United States Patent
Yang (10) Patent No.: US 7,229,216 B2
(45) Date of Patent: Jun. 12, 2007

(54) OPTICAL CONTACT MODULE

(76) Inventor: Kwan-suk Yang, 308-401 Shinan-poonglim A.P.T., 1235, Kwonsun-dong, Kwonsun-gu, Suwon-si, Gyunggi-do (KR) 441-834

( * ) Notice: Subject to any disclaimer, the term of this patent is extended or adjusted under 35 U.S.C. 154(b) by 0 days.

(21) Appl. No.: 10/534,732

(22) PCT Filed: Nov. 12, 2003

(86) PCT No.: PCT/KR03/02429

§ 371 (c)(1), (2), (4) Date: May 12, 2005

(87) PCT Pub. No.: WO2004/044635

PCT Pub. Date: May 27, 2004

(65) Prior Publication Data

US 2006/0098922 A1    May 11, 2006

(30) Foreign Application Priority Data

Nov. 30, 2002    (KR) ............ 10-2002-0070352

(51) Int. Cl.
*G02B 6/36* (2006.01)
*G02B 6/00* (2006.01)

(52) U.S. Cl. .................................. 385/88; 385/92
(58) Field of Classification Search ............ 385/88
See application file for complete search history.

(56) References Cited

U.S. PATENT DOCUMENTS 4,850,664 A    7/1989   Iri et al.
5,980,118 A   11/1999   Henningsson et al.
2005/0002620 A1*  1/2005  Tanaka .................... 385/92

FOREIGN PATENT DOCUMENTS

| JP | 60-250312 | 12/1985 |
| JP | 10-206674 | 8/1988 |
| JP | 09-222533 | 8/1997 |
| KR | 1991-0006772 | 9/1991 |
| KR | 1999-44025 | 6/1999 |

* cited by examiner

Primary Examiner—Sung Pak
(74) Attorney, Agent, or Firm—Volpe and Koenig P.C.

(57) ABSTRACT

The present invention relates to an optical contact module. The optical contact module comprises an optical device receiving member (20) including an optical device receiving portion (21) formed with an optical device receiving space for receiving an optical device therein, an optical fiber receiving portion (23) formed with an optical fiber receiving space for receiving an optical fiber therein, a contact hole (22) for communicating the optical device receiving portion (21) with the optical fiber receiving portion (23), a slit (27) formed on the optical fiber receiving portion (23) and a projection portion extended from the distal end of the optical device receiving portion; an optical fiber fixing cap (10) including a receiving portion (13), and a through-hole (12); and a fastening means for detachably fastening the optical fiber fixing cap (10) to the optical device receiving member (20).

12 Claims, 9 Drawing Sheets

OPTICAL CONTACT MODULE

This application is a 371 of PCT/KR03/02429, filed Nov. 12, 2003.

FIELD OF THE INVENTION

The present invention relates to an optical contact module, and more particularly, to an optical contact module capable of easily connecting a single optical fiber for transmitting an optical signal with an optical transmission terminal or an optical reception terminal in such a manner that the optical signal does not leak.

BACKGROUND

Generally, an optical fiber comprises a core through which an optical signal is transmitted, a clad for enclosing the core, and a sheath layer for protecting the core and the clad.

In a case where a single optical fiber is used for a security system, the optical fiber is installed to measure dynamic or static changes in an optical signal transmitted through the optical fiber, or to measure physical fluctuation in the optical fiber using back scattering of the optical signal.

A technique regarding a security system using an optical fiber is disclosed in PCT Application No. PCT/KR02/0164 entitled "Security System Using Optical Fiber and Method of Controlling the Same" and filed on Aug. 30, 2002 by the present applicant. Particularly, when the optical fiber is connected to an optical transmitter module and an optical receiver module in the invention of this application, an optical contact means capable of easily connecting optical fibers that have been cut to have appropriate lengths in place is required.

Further, the optical contact means for use in such a security system is required to have the function of avoiding optical loss and shielding noises from the outside by completely sealing a contact portion.

Moreover, the optical contact means for use in such a security system is required to have the function of protecting the security system in such a manner that when external force exceeding a predetermined value is applied to the optical fiber, the optical fiber is easily separated from the security system to prevent the security system from being damaged.

Further, the optical contact means for use in such a security system is required to have the function of allowing a damaged or antiquated optical fiber to be easily replaced and reinstalled from the outside.

However, since the conventional optical contact means has a structure for fixing the optical fiber by compressing a sheath of the optical fiber with a metal piece, inexact dimensions of the metal piece may damage the core or clad of the optical fiber. Therefore, there is a problem that since the metal piece should be precisely machined, manufacturing costs thereof are increased.

Furthermore, there is a problem that if the optical contact means is molded with synthetic resin or the like to be completely sealed, it is impossible to properly adjust the length of the optical fiber and reinstall the optical fiber according to installation conditions.

SUMMARY

The present invention is conceived to solve the problems of the conventional optical contact means. Accordingly, an object of the present invention is to provide an optical fiber contact means having the functions required upon connection of optical fibers in a security system employing optical fibers that has been proposed by the present applicant.

Specifically, an object of the present invention is to provide an optical contact module capable of easily connecting optical fibers cut to have proper lengths in place, avoiding optical loss and shielding noises from the outside by completely sealing a contact portion, preventing a security system from being damaged by causing an optical fiber to be easily separated from the security system if external force exceeding a predetermined value is applied to the optical fiber, allowing a damaged or antiquated optical fiber to be easily replaced from the outside, and fixedly supporting the optical fiber with appropriate elastic force without damage to a core or clad of the optical fiber.

The optical contact module of the present invention connects a single optical fiber for transmitting an optical signal to an optical device such as a light emitting device or a light receiving device. The optical contact module comprises an optical device receiving member including an optical device receiving portion formed with an optical device receiving space for receiving the optical device therein from one end of the optical device receiving member, an optical fiber receiving portion formed with an optical fiber receiving space for receiving an optical fiber therein from the other end thereof, a contact hole having a predetermined diameter to communicate the optical device receiving portion with the optical fiber receiving portion, and a slit formed in the optical fiber receiving portion by removing a portion of an outer periphery of the optical fiber receiving portion by a predetermined length from the other end; an optical fiber fixing cap including a receiving portion which has a taper formed lengthwise such that the inner diameter of the receiving portion can be decreased to radially press the optical fiber receiving portion formed with the slit when the optical fiber receiving portion of the optical device receiving member is to be received therein from one end of the optical fiber fixing cap, and a through-hole at the other end thereof so that the optical fiber can be inserted into the receiving portion; and a fastening means formed on the outer periphery of the optical fiber receiving portion of the optical device receiving member and on an inner periphery of the receiving portion of the optical fiber fixing cap to detachably fasten the optical fiber fixing cap to the optical device receiving member.

According to the present invention, when the optical fiber fixing cap is coupled to the optical device receiving member, the slit formed in the optical fiber receiving portion is compressed by the taper of the optical fiber fixing cap, thereby fixing the optical fiber with elastic force.

Preferably, the optical contact module further comprises a projection portion extending lengthwise from a distal end of the optical device receiving portion of the optical device receiving member. The optical fiber receiving portion of the optical device receiving member is formed with a taper such that the outer diameter of the optical fiber receiving portion is increased from a distal end thereof, and a plurality of slits are formed circumferentially at a predetermined interval in the optical fiber receiving portion.

According to the present invention, the projection portion is inserted into a groove of an optical transmitter module or an optical receiver module to fix the optical device receiving member so that the optical device receiving member does not rotate when the optical fiber fixing cap is coupled to the optical device receiving member, thereby ensuring easy coupling of them.

Preferably, the optical contact module further comprises an optical fiber supporting member which is made of an elastic material, has a through-hole for receiving the optical fiber therein and is inserted into the optical fiber receiving portion of the optical device receiving member.

Preferably, a step is formed due to the outer diameter of the optical device receiving portion of the optical device receiving member larger than that of the optical fiber receiving portion thereof, and the optical contact module further comprises an O-ring fitted around the outer periphery of the optical fiber receiving portion and interposed between the step and the optical fiber fixing cap.

According to the present invention, the optical fiber supporting member supports the optical fiber without damage to a sheath of the optical, and alleviates differences in dimensions therebetween, and the O-ring prevents intrusion of raindrops from the outside.

Preferably, the fastening means comprises male threads formed on the outer periphery of the optical fiber receiving portion of the optical device receiving member and female threads formed on the inner periphery of the receiving portion of the optical fiber fixing cap.

Preferably, a pair of projection portions are formed on the optical device receiving member.

EXPLANATION OF REFERENCE NUMERALS FOR DESIGNATING MAIN COMPONENTS IN THE DRAWINGS

10: Optical fiber fixing cap 12: Through-hole
13: Receiving portion 15, 25: Taper
16: Female thread 17: Coupling groove
20: Optical device receiving member 21: Optical device receiving portion
22: Contact hole 23: Optical fiber receiving portion
24: Projection portion 26: Male thread
27: Slit 28: Coupling ridge
100: Optical contact module 110: Optical fiber supporting member
120: O-ring 220: Optical fiber
300: Control unit 400: Optical transmitter module
500: Optical receiver module

DETAILED DESCRIPTION OF THE PREFERRED EMBODIMENTS

Preferred embodiments of the present invention will be described in detail with reference to the accompanying drawings.

Figure 1:
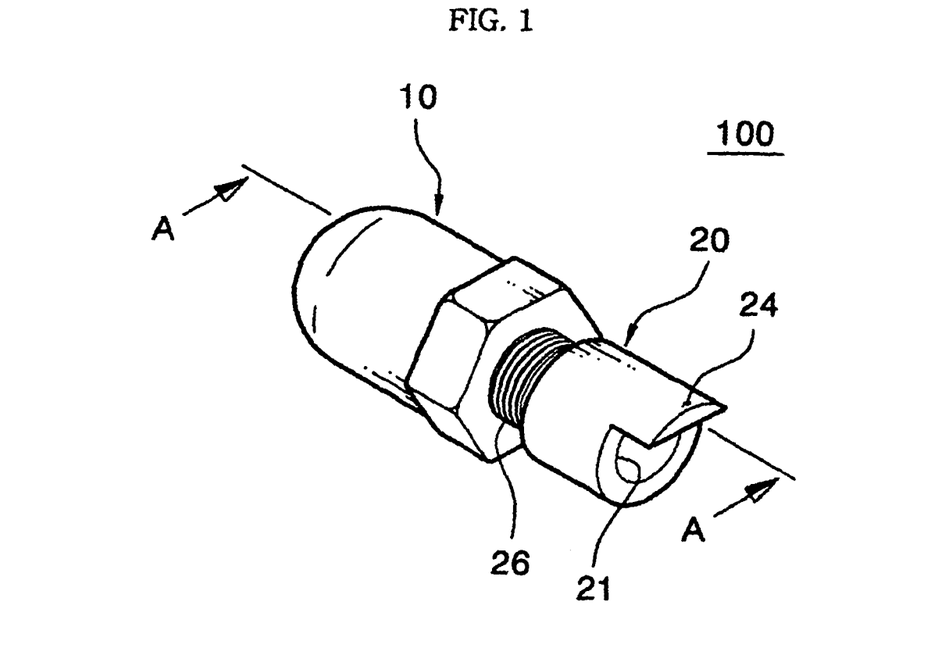
FIG. 1 is a perspective view of an optical contact module according to an embodiment of the present invention.
Figure 2:
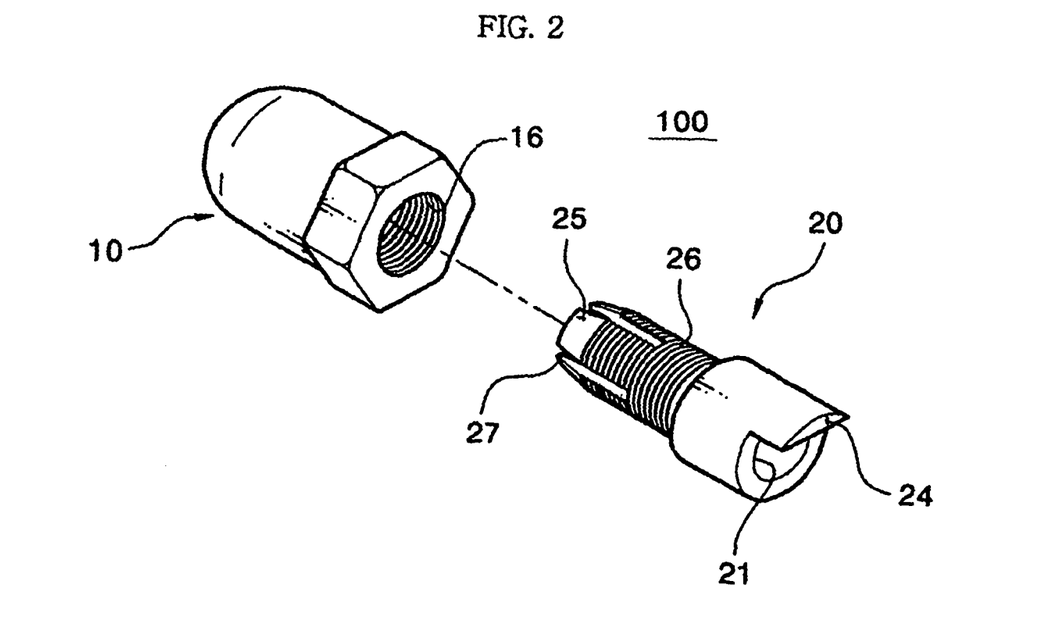
FIG. 2 is an exploded perspective view of the optical contact module of FIG. 1.
Figure 3A:
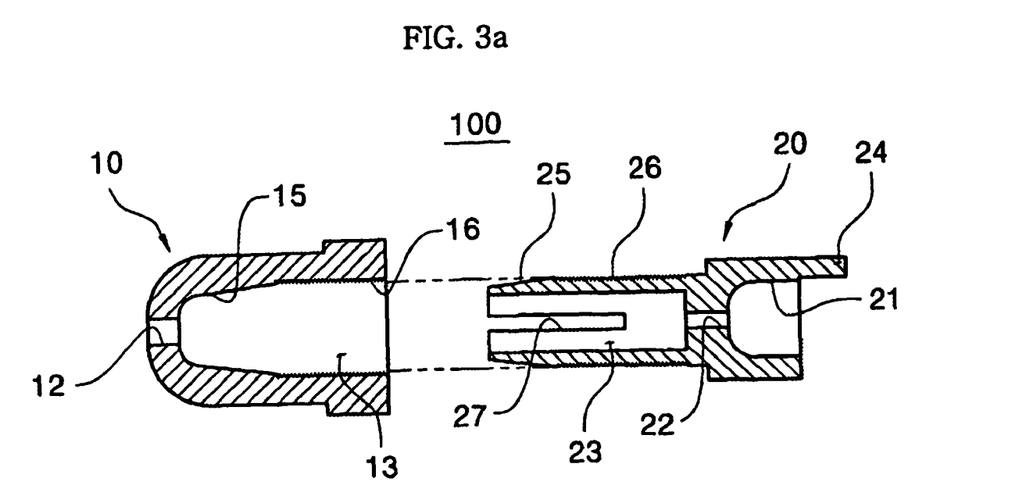
FIG. 3a is a sectional view taken along line A—A in FIG. 1.
Figure 3B:
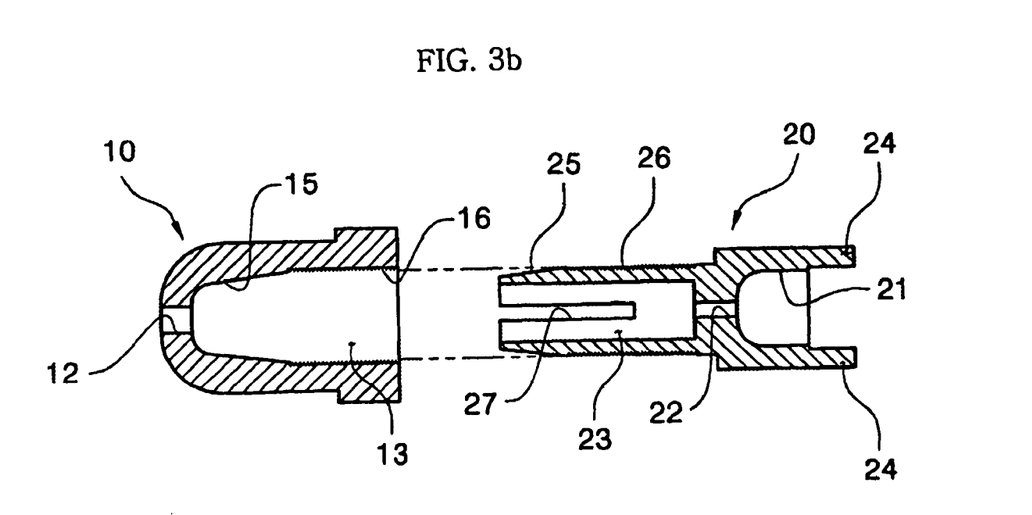
FIG. 3b is a sectional view taken along line A—A in another example of the optical contact module of FIG. 1.

FIG. 1 is a perspective view of an optical contact module according to an embodiment of the present invention, FIG. 2 is an exploded perspective view of the optical contact module of FIG. 1, FIG. 3a is a sectional view taken along line A—A in FIG. 1, and FIG. 3b is a sectional view taken along line A—A in another example of the optical contact module of FIG. 1.

As shown in FIG. 1, the optical contact module according to the embodiment of the present invention comprises an optical device receiving member 20 for accommodating a light emitting device or a light receiving device, and an optical fiber fixing cap 10 that is fastened to the optical device receiving member 20 and fixes an optical fiber.

As shown in FIGS. 2 and 3, the optical device receiving member 20 has an optical device receiving portion 21 extending from one end into the optical device receiving member to receive the light emitting device or the light receiving device, and further has an optical fiber receiving portion 23 extending by a predetermined length from the other end into the optical device receiving member to receive an optical fiber. A single optical fiber, preferably, a plastic optical fiber is used as the optical fiber. Further, an contact hole 22 with a predetermined diameter is formed to communicate the optical device receiving portion 21 with the optical fiber receiving portion 23, so that when the optical device received in the optical device receiving portion 21 is a light emitting device, light or an optical signal output from the light emitting device is transmitted to the optical fiber received in the optical fiber receiving portion 23, while when the optical device received in the optical device receiving portion 21 is a light receiving device, an optical signal from the optical fiber received in the optical fiber receiving portion 23 is transmitted to the light receiving device received in the optical device receiving portion 21. Of course, a portion of an end of the optical fiber may be inserted into the contact hole upon actual installation of the optical fiber. Further, a projection portion 24 extending lengthwise from the end of the optical device receiving portion 21 is additionally provided so that the optical contact module 100 can be inserted into a substrate of an optical transceiver module to be described later. Moreover, the optical fiber receiving portion 23 is formed with a taper 25 such that the outer diameter of the optical fiber receiving portion 23 can increase over a predetermined length from a distal end thereof. A plurality of slits 27 are formed in the optical fiber receiving portion 23 by removing some portions of an outer periphery of the optical fiber receiving portion 23 from the distal end thereof to have a length larger than that of the taper 25. Male threads 26 are formed as a fastening means on the outer periphery to be screwed into the optical fiber fixing cap 10. Meanwhile, one projection portion 24 can be provided as shown in FIG. 3a, or a pair of projection portions 24 may be provided to be caught in both sides of the substrate of the optical transceiver module as shown in FIG. 3b.

As shown in FIGS. 2 and 3, the optical fiber fixing cap 10 has a receiving portion 13 extending from one end into the optical fiber fixing cap to receive the optical fiber receiving portion 23 of the optical device receiving member 20, and further has a throughhole 12 at the other end thereof so that the optical fiber can pass through the receiving portion 13. A taper 15 is formed lengthwise in the receiving portion 13 such that the inner diameter of the receiving portion can be decreased. Thus, when the taper 15 comes into contact with the taper 25 formed in the optical fiber receiving portion 23 of the optical device receiving member 20, the optical fiber receiving portion 23 with the slots 27 is radially pressed. Further, female threads 16 are formed as a fastening means on an inner surface of the receiving portion 13 to be engaged with the male threads 26 formed in the optical fiber receiving portion 23.

The optical contact module may further comprise an optical fiber supporting member to be received in the optical fiber receiving portion 23 to fix the optical fiber. The optical fiber supporting member is made of rubber or the like that is an elastic material and has a through-hole for receiving the optical fiber therein.

Moreover, a step is formed due the outer diameter of the optical device receiving portion 21 of the optical device receiving member 20 larger than that of the optical fiber receiving portion 23, and the optical contact module may further comprise an O-ring fitted around the outer periphery of the optical fiber receiving portion 23 to be placed between the step and the optical fiber fixing cap 10.

Figure 4:
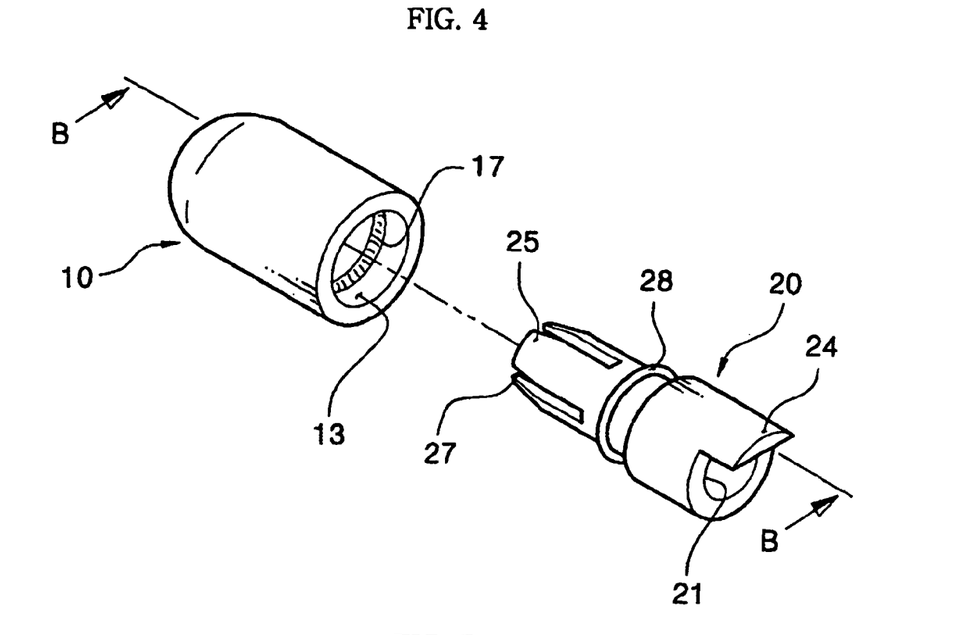
FIG. 4 is an exploded perspective view of an optical contact module according to another embodiment of the present invention.
Figure 5A:
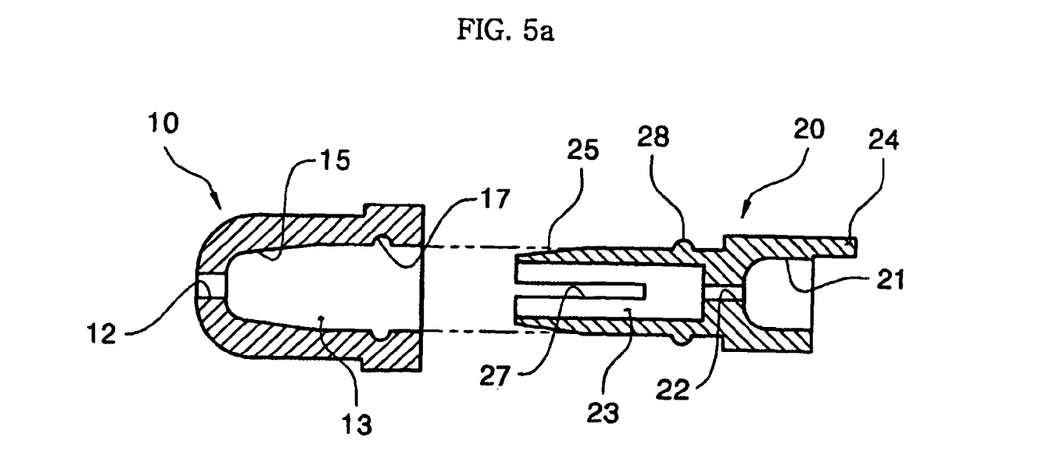
FIG. 5a is a sectional view taken along line B—B in FIG. 4.
Figure 5B:
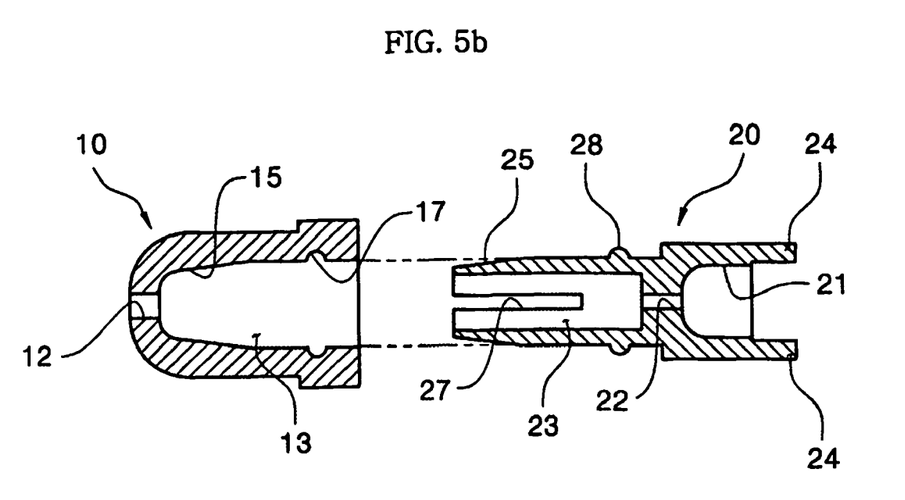
FIG. 5b is a sectional view taken along line B—B in another example of the optical contact module of FIG. 4.

FIG. 4 is an exploded perspective view of an optical contact module according to another embodiment of the present invention, FIG. 5a is a sectional view taken along line B—B in FIG. 4, and FIG. 5b is a sectional view taken along line B—B in another example of the optical contact module of FIG. 4.

As shown in FIG. 4, the optical contact module 100 according to the other embodiment of the present invention comprises an optical device receiving member 20 for accommodating a light emitting device or a light receiving device, and an optical fiber fixing cap 10 that is fastened to the optical device receiving member 20 and fixes an optical fiber. As shown in FIG. 5, the optical device receiving member 20 is formed with a coupling ridge 28 having a predetermined height on the outer periphery of the optical fiber receiving portion 23, and a coupling groove 17 having a predetermined depth is formed in an inner surface of the optical fiber fixing cap 10 to be coupled to the coupling ridge 28. Therefore, although the optical contact module 100 according to the other embodiment of the present invention does not have the male threads 26 and the female threads 16 of the optical contact module of the previous embodiment, the coupling groove 17 of the optical fiber fixing cap 10 and the coupling ridge 28 of the optical device receiving member 20 are coupled to each other as a coupling means. The function of fixing and connecting the optical fiber is the same as the previous embodiment. Meanwhile, one projection portion 24 can be provided to be inserted into the substrate of the optical transceiver as shown in FIG. 5a, or a pair of projection portions may be provided to be caught in both sides of the substrate of the optical transceiver module as shown in FIG. 5b.

The operation and effects of an optical contact module according to an embodiment of the present invention will be described hereinafter in connection with a security system employing an optical fiber as an optical fiber sensor.

Figure 6:
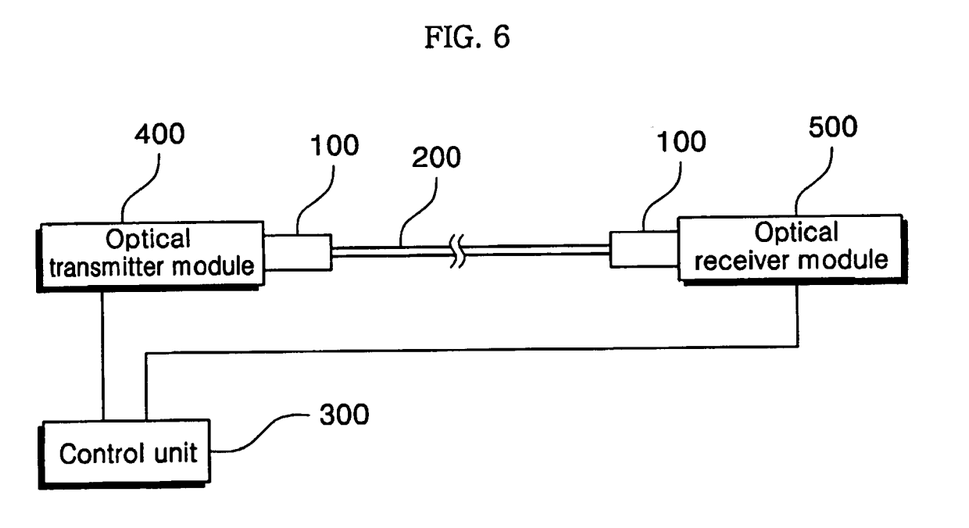
FIG. 6 is a schematic view showing the constitution of a security system employing an optical contact module according to an embodiment of the present invention.
Figure 7:
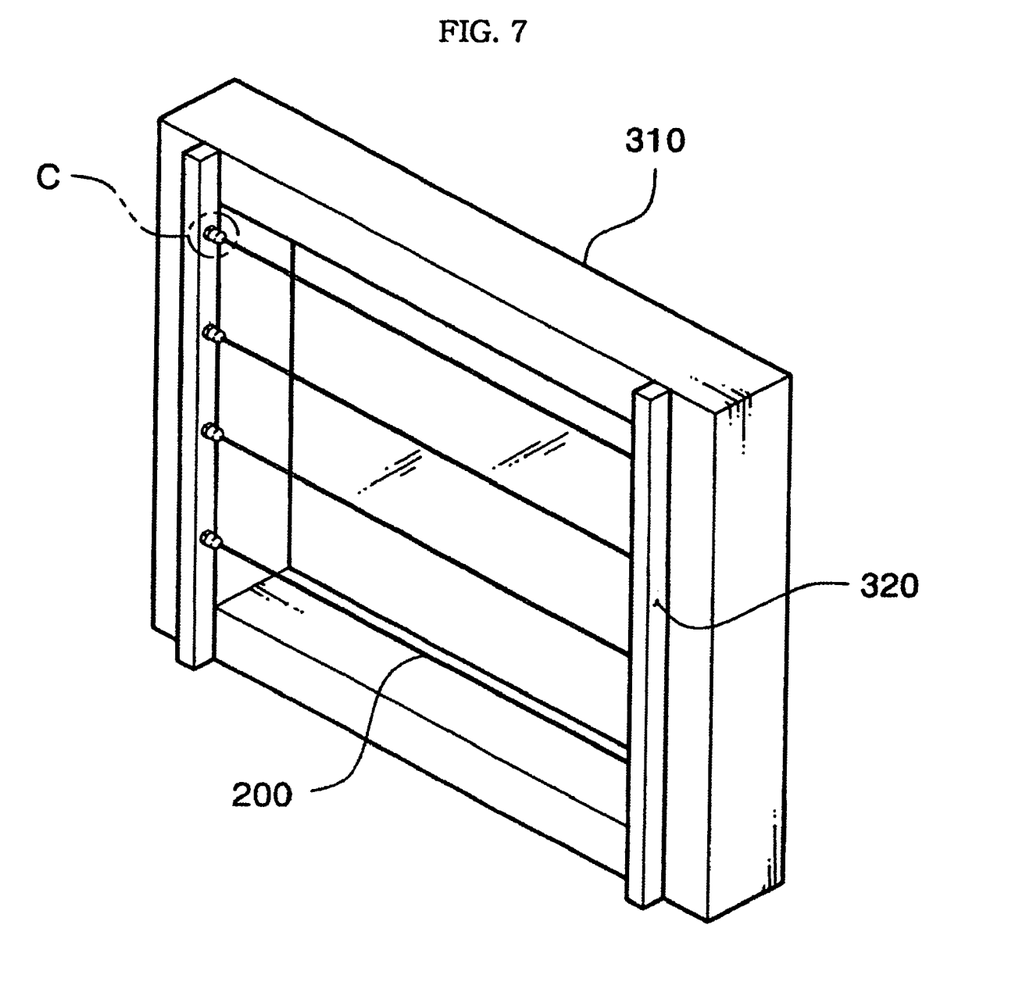
FIG. 7 is a view showing a state where the security system employing the optical contact module according to the embodiment of the present invention is used.
Figure 8A:
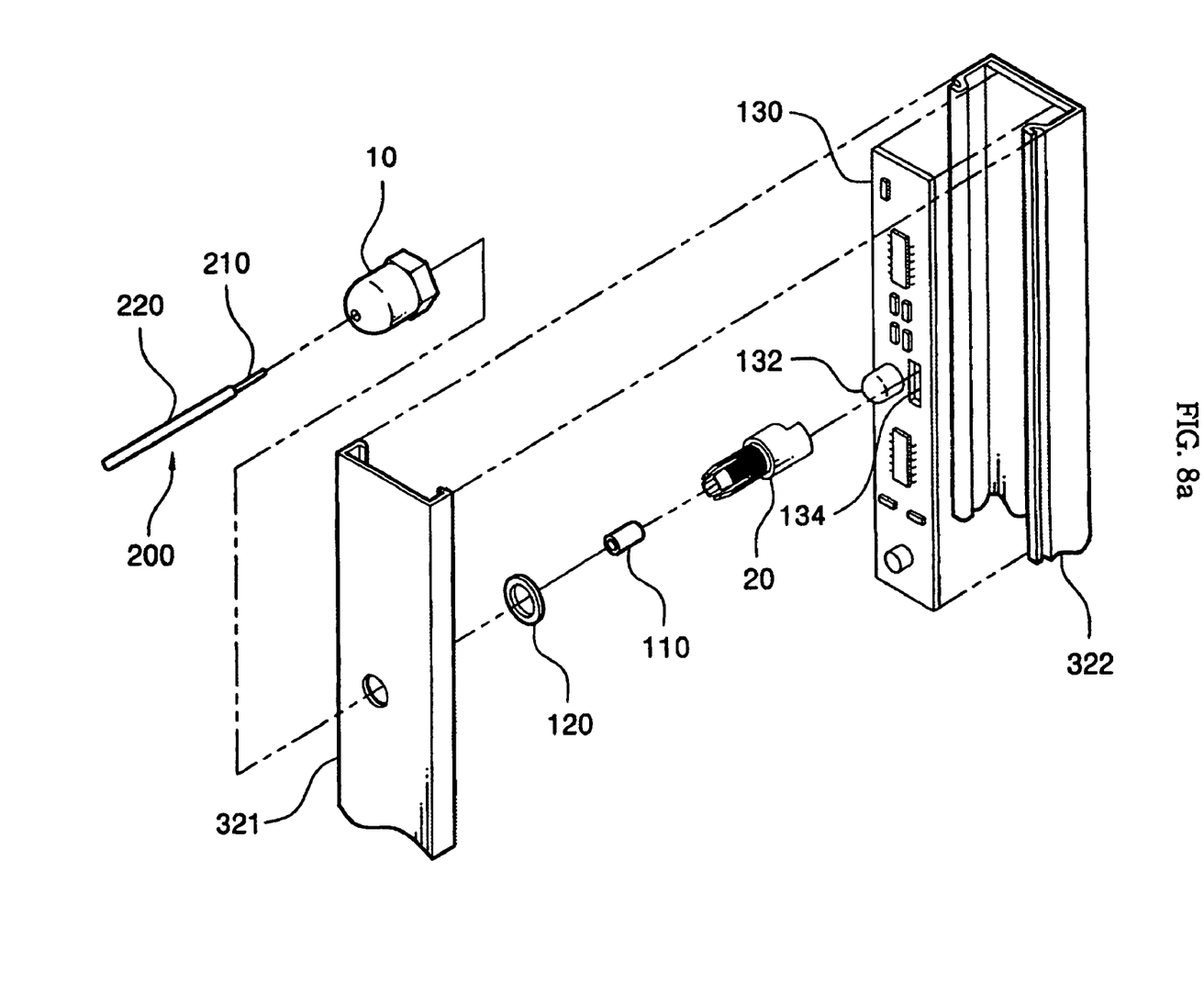
FIG. 8a is an exploded perspective view of portion C in the security system of FIG. 7.
Figure 8B:
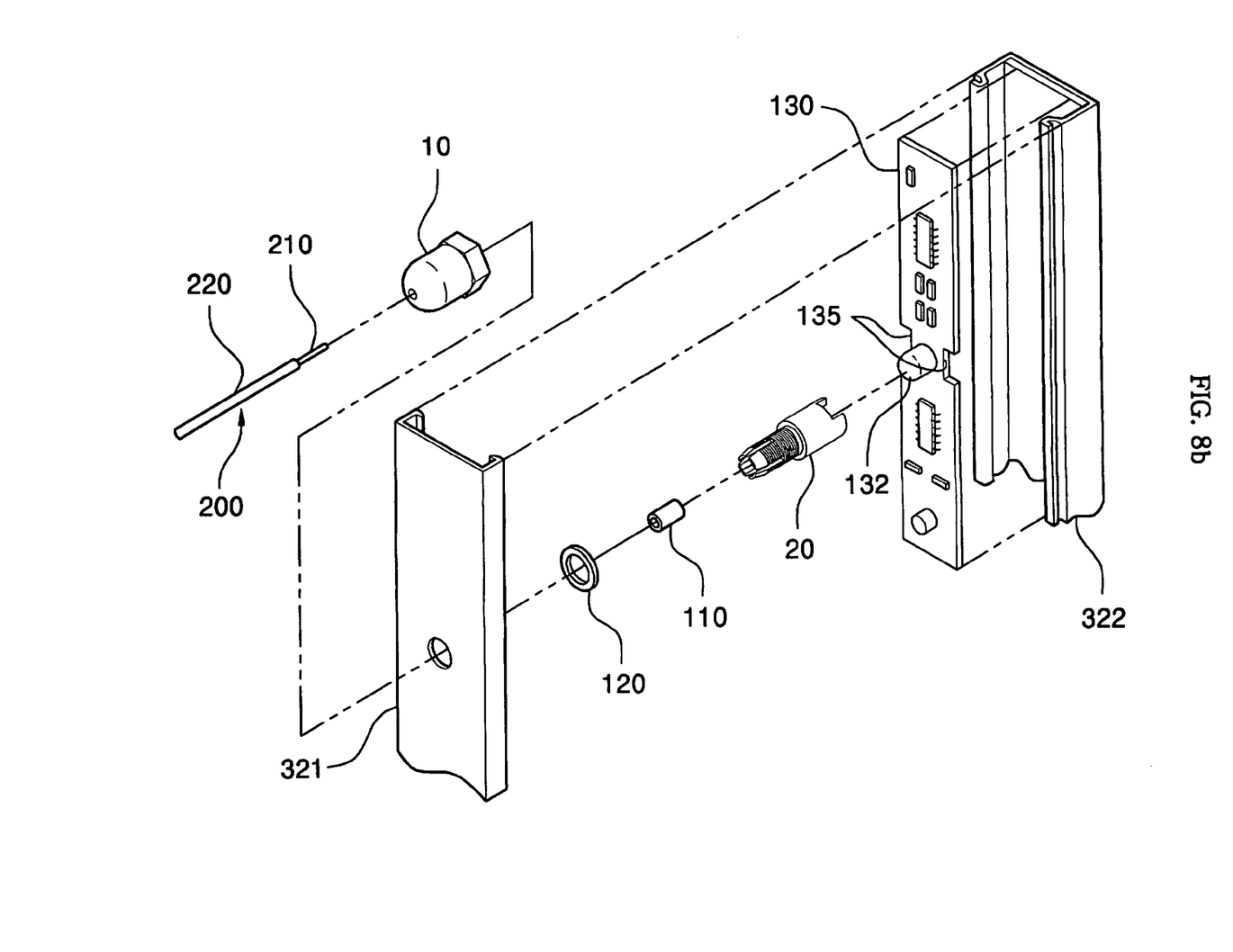
FIG. 8b is an exploded perspective view of portion C in another example of the security system of FIG. 7.
Figure 9A:
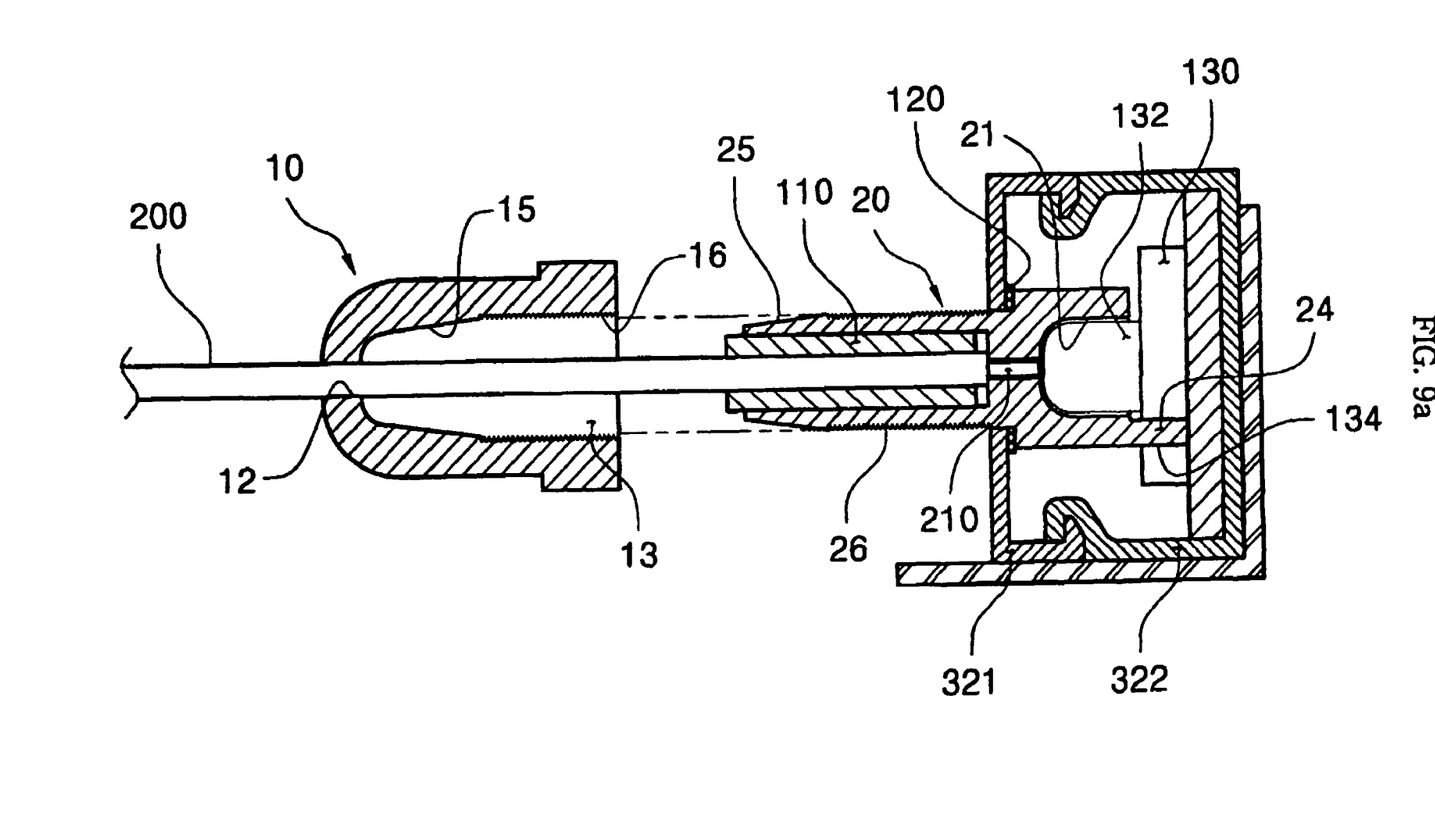
FIG. 9a is a sectional view of portion C in the security system of FIG. 7.
Figure 9B:
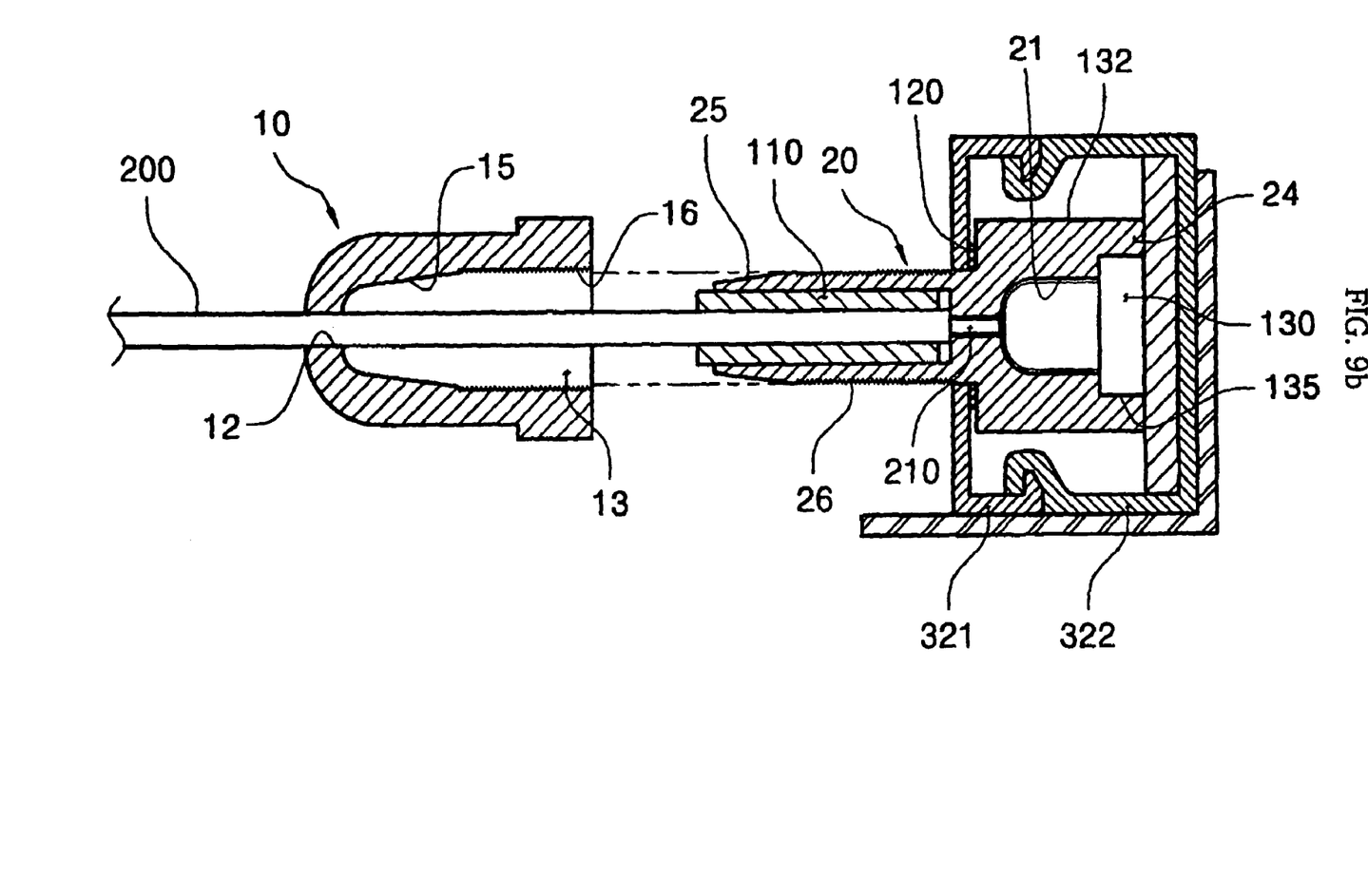
FIG. 9b is a sectional view of portion C in the other example of the security system of FIG. 7.

FIG. 6 is a schematic view showing the constitution of a security system employing an optical contact module according to an embodiment of the present invention, FIG. 7 is a view showing a state where the security system employing the optical contact module according to the embodiment of the present invention is used, FIG. 8a is an exploded perspective view of portion C in the security system of FIG. 7, FIG. 8b is an exploded perspective view of portion C in another example of the security system of FIG. 7, FIG. 9a is a sectional view of portion C in the security system of FIG. 7, and FIG. 9b is a sectional view of portion C in the other example of the security system of FIG. 7.

As shown in FIG. 6, the security system employing the optical contact module according to the embodiment of the present invention comprises an optical transmitter module 400 for outputting a predetermined optical signal, an optical receiver module 500 for receiving the optical signal output from the optical transmitter module 400 and converting the optical signal into a predetermined electric signal, an optical fiber 200 for transmitting the optical signal, the optical contact module 100 for connecting both ends of the optical fiber 200 to the optical transmitter module 400 and the optical receiver module 500, respectively, and a control unit 300 for controlling the optical transmitter module 400 and the optical receiver module 500.

As shown in FIG. 7, the optical transmitter module 400, the optical contact module 100, the optical fiber 200, the optical contact module 100 and the optical receiver module 500 can be provided in pair and installed on the right and left sides of a window 310 or the like. Further, it will be apparent to those skilled in the art that a plurality of optical transmitter modules 400, optical contact modules 100, optical fibers 200, optical contact modules 100 and optical receiver modules 500 may be connected in parallel to one another to monitor a more wider range. FIG. 7 shows a state where a plurality of optical transmitter modules 400 and optical receiver modules 500 are mounted within an optical transmitter module case 320.

FIGS. 8a to 9b show portion C of FIG. 7 and illustrate the process of connecting the optical fiber 200 to the optical transmitter module 400 using the optical contact module 100. The optical transmitter module case 320 comprises an exterior case 322 and a cover 321. For the connection of the optical fiber, a substrate 130 of the optical transmitter module and the optical device receiving member 20 are first installed on the exterior case 322, then an O-ring 120 is fitted and the cover 321 is placed. At this moment, a light emitting device 132 is inserted into the optical device receiving portion 21 of the optical device receiving member 20. Further, since the projection portion 24 formed on the optical device receiving member 20 is inserted into an insertion groove 134 formed in the substrate 130 to be installed within the exterior case 322, as shown in FIGS. 8a and 9a, the optical device receiving member 20 does not rotate when the optical fiber fixing cap 10 is rotated to be fastened to the optical device receiving member 20. Alternatively, as shown in FIGS. 8b and 9b, the pair of the projection portions 24 formed on the optical device receiving member 20 can be fastened to catching steps 135 formed on the optical transceiver module. Further, the O-ring 120 interposed between the cover 321 and the optical device receiving member 20 prevents raindrops from penetrating into the case. Next, a single optical fiber 220 is inserted into the through-hole of the optical fiber fixing cap 10 and the optical fiber supporting member 110 is fitted around the inserted end of the optical fiber that in turn is inserted into the optical fiber receiving portion 23 of the optical device receiving member 20 through a hole of the cover. Thereafter, the female threads formed on the inner surface of the optical fiber fixing cap 10 are screwed onto the male threads formed on the outer periphery of the optical fiber receiving portion 23. At this time, the taper in the optical fiber fixing cap proceeds while pressing the tapered end of the optical fiber receiving portion 23, thereby compressing and fixing the sheath of the optical fiber.

As shown in FIGS. 9a and 9b, in a state where the optical fiber 200 has been assembled and fixed in such a manner, a core 210 is positioned close to the light emitting device 132 through the contact hole 22 to receive light or an optical signal emitted from the light emitting device 132. Further, the optical fiber 200 passes through the optical fiber supporting member 110, and the sheath 220 of the optical fiber is pressed and fixed within the optical fiber receiving portion 21 of the optical device receiving member 20 having the slits 27 by means of the optical fiber supporting member 110, and then further compressed when the optical fiber fixing cap 10 is screwed onto the optical device receiving member. Therefore, the optical fiber 200 is fixed by compressing the sheath 220 without damaging the core 210 of the optical fiber 200, the loss of the optical signal is avoided, and the introduction of noises and foreign materials from the outside is effectively prevented. Further, since the optical fiber can be cut and installed in place depending on the length required for an installation space, it is possible to variously change the length of the optical fiber depending on installation conditions.

INDUSTRIAL APPLICABILITY

As described above, the optical contact module of the present invention can easily connect optical fibers cut in desired lengths in place, and avoid optical loss and shield noises from the outside by completely sealing a contact portion. Further, the optical contact module of the present invention can prevent a security system from being damaged by allowing the optical fiber to be easily separated from the security system if external force exceeding a predetermined value is applied to the optical fiber, cause a damaged or antiquated optical fiber to be easily replaced from the outside, and fixedly support the optical fiber with appropriate elastic force without damage to a core or clad of the optical fiber.

It is intended that the embodiments of the present invention described above and illustrated in the drawings should not be construed as limiting the technical spirit of the present invention. The scope of the present invention is defined only by the appended claims. Those skilled in the art can make various changes and modifications thereto without departing from its true spirit. Therefore, various changes and modifications obvious to those skilled in the art will fall within the scope of the present invention.

The invention claimed is:

1. An optical contact module to be installed to an optical transceiver module for connecting a single optical fiber for transmitting and receiving an optical signal to and from an optical device, the optical contact module comprising:

an optical device receiving member including an optical device receiving portion formed with an optical device receiving space for receiving the optical device therein from one end of the optical device receiving member, an optical fiber receiving portion formed with an optical fiber receiving space for receiving an optical fiber therein from the other end thereof, a contact hole having a predetermined diameter to communicate the optical device receiving portion with the optical fiber receiving portion, a slit formed in the optical fiber receiving portion by removing a portion of an outer periphery of the optical fiber receiving portion by a predetermined length from the other end, and a projection portion extended lengthwise from a portion of a distal end of the optical device receiving portion of the optical device receiving member, the projection portion being inserted into an insertion groove formed on a substrate of the optical transceiver module for installing the optical contact module to the optical transceiver module;

an optical fiber fixing cap including a receiving portion which has a taper formed lengthwise such that the inner diameter of the receiving portion can be decreased to radially press the optical fiber receiving portion formed with the slit when the optical fiber receiving portion of the optical device receiving member is to be received therein from one end of the optical fiber fixing cap, and a through-hole at the other end thereof so that the optical fiber can be inserted into the receiving portion; and a fastening means formed on the outer periphery of the optical fiber receiving portion of the optical device receiving member and on an inner periphery of the receiving portion of the optical fiber fixing cap to detachably fasten the optical fiber fixing cap to the optical device receiving member.

2. The optical contact module according to claim 1, wherein the optical fiber receiving portion of the optical device receiving member is formed with a taper such that the outer diameter of the optical fiber receiving portion is increased from a distal end thereof, and a plurality of slits are formed circumferentially at a predetermined interval in the optical fiber receiving portion.

3. The optical contact module according to claim 1, further comprising:

an optical fiber supporting member which is made of an elastic material, has a through-hole for receiving the optical fiber therein and is inserted into the optical fiber receiving portion of the optical device receiving member.

4. The optical contact module according to claim 1, wherein a step is formed due to the outer diameter of the optical device receiving portion of the optical device receiving member larger than that of the optical fiber receiving portion thereof, and an O-ring fitted around the outer periphery of the optical fiber receiving portion is interposed between the step and the optical fiber fixing cap.

5. The optical contact module according to claim 1, wherein the fastening means comprises male threads formed on the outer periphery of the optical fiber receiving portion of the optical device receiving member and female threads formed on the inner periphery of the receiving portion of the optical fiber fixing cap.

6. The optical contact module according to claim 1, wherein the fastening means comprises an annular coupling ridge protruding from the outer periphery of the optical fiber receiving portion of the optical device receiving member, and a coupling groove formed on the inner periphery of the receiving portion of the optical fiber fixing cap to receive the coupling ridge.

7. The optical contact module according to claim 1, wherein a pair of projection portions are formed on the optical device receiving member.

8. The optical contact module according to claim 2, wherein a pair of projection portions are formed on the optical device receiving member.

9. The optical contact module according to claim 3, wherein a pair of projection portions are formed on the optical device receiving member.

10. The optical contact module according to claim 4, wherein a pair of projection portions are formed on the optical device receiving member.

11. The optical contact module according to claim 5, wherein a pair of projection portions are formed on the optical device receiving member.

12. The optical contact module according to claim 6, wherein a pair of projection portions are formed on the optical device receiving member.

* * * * *